United States Patent
Ward et al.

(10) Patent No.: US 10,479,948 B2
(45) Date of Patent: Nov. 19, 2019

(54) PROCESS FOR THE PRODUCTION OF LIGHT OLEFINS AND AROMATICS FROM A HYDROCARBON FEEDSTOCK

(71) Applicants: SAUDI BASIC INDUSTRIES CORPORATION, Riyadh (SA); SABIC Global Technologies B.V., Bergen op Zoom (NL); Andrew Mark Ward, Stockton-on-Tees (GB); Arno Johannes Maria Oprins, Maastricht (NL); Thomas Hubertus Maria Housmans, Geleen (NL)

(72) Inventors: Andrew Mark Ward, Stockton-on-Tees (GB); Arno Johannes Maria Oprins, Maastricht (NL); Thomas Hubertus Maria Housmans, Geleen (NL)

(73) Assignees: SAUDI BASIC INDUSTRIES CORPORATION, Riyadh (SA); SABIC GLOBAL TECHNOLOGIES B.V., Bergen op Zoom (NL)

( * ) Notice: Subject to any disclaimer, the term of this patent is extended or adjusted under 35 U.S.C. 154(b) by 58 days.

(21) Appl. No.: 14/901,736

(22) PCT Filed: Jun. 30, 2014

(86) PCT No.: PCT/EP2014/063850
§ 371 (c)(1),
(2) Date: Dec. 29, 2015

(87) PCT Pub. No.: WO2015/000842
PCT Pub. Date: Jan. 8, 2015

(65) Prior Publication Data
US 2016/0369189 A1    Dec. 22, 2016

(30) Foreign Application Priority Data
Jul. 2, 2013  (EP) .................................... 13174765

(51) Int. Cl.
*C10G 69/06* (2006.01)
*C10G 69/04* (2006.01)
*C10G 69/00* (2006.01)

(52) U.S. Cl.
CPC .............. *C10G 69/06* (2013.01); *C10G 69/00* (2013.01); *C10G 69/04* (2013.01);
(Continued)

(58) Field of Classification Search
CPC ........ C10G 65/10; C10G 67/00; C10G 67/02; C10G 67/0445; C10G 69/00; C10G 69/02; C10G 69/04; C10G 69/06
See application file for complete search history.

(56) References Cited

U.S. PATENT DOCUMENTS 3,172,834 A * 3/1965 Kozlowski ................ C10L 1/06
208/111.25
3,433,848 A  3/1969 Devins et al.
(Continued)

FOREIGN PATENT DOCUMENTS

EP    0192059 A1   8/1986
EP    0909582 A1   4/1999
(Continued)

OTHER PUBLICATIONS

Alfke et al., Ullmann's Encyclopedia of Industrial Chemistry 7th Edition, vol. 25, Oil Refining, 57 Pages.
(Continued)

*Primary Examiner* — Prem C Singh
*Assistant Examiner* — Brandi M Doyle
(74) *Attorney, Agent, or Firm* — Norton Rose Fulbright US LLP

(57) ABSTRACT

The present invention relates to a process for the production of light olefins and aromatics from a hydrocarbon feedstock, comprising the following steps of: (a) feeding a hydrocarbon
(Continued)

feedstock into a FCC unit (b) separating reaction products, which are generated from the FCC reaction, into a bottom stream, and middle stream and a top stream; (c) feeding the middle stream from (b) to a gasoline hydrocracker (GHC) unit, (d) separating reaction products of said GHC of step (c) into an overhead gas stream comprising hydrogen, methane and C2-C4 paraffins, and a bottom stream comprising aromatic hydrocarbon compounds, (e) feeding the overhead stream from the gasoline hydrocracker (GHC) unit into a steam cracker unit.

1 Claim, 1 Drawing Sheet

(52) U.S. Cl.
CPC ............... *C10G 2300/107* (2013.01); *C10G 2300/1044* (2013.01); *C10G 2300/1051* (2013.01); *C10G 2300/1055* (2013.01); *C10G 2300/1059* (2013.01); *C10G 2300/1077* (2013.01); *C10G 2300/1085* (2013.01); *C10G 2400/20* (2013.01); *C10G 2400/30* (2013.01); *Y02P 30/40* (2015.11)

(56) References Cited

U.S. PATENT DOCUMENTS

| | | | |
|---|---|---|---|
| 3,842,138 A | | 10/1974 | Chahvekilian et al. |
| 4,137,147 A | * | 1/1979 | Franck ............... B01J 29/20 208/61 |
| 4,207,167 A | | 6/1980 | Bradshaw |
| 4,492,624 A | * | 1/1985 | Johnson ............... C10G 9/14 208/130 |
| 4,827,072 A | | 5/1989 | Imai et al. |
| 4,926,005 A | | 5/1990 | Olbrich et al. |
| 5,849,402 A | | 12/1998 | Mandal et al. |
| 5,990,370 A | * | 11/1999 | Sims ............... C07C 4/04 585/302 |
| 6,153,087 A | | 11/2000 | Bigeard et al. |
| 6,270,654 B1 | | 8/2001 | Colyar et al. |
| 6,900,365 B2 | | 5/2005 | Chen et al. |
| 7,214,308 B2 | | 5/2007 | Colyar |
| 7,622,623 B2 | | 11/2009 | Fridman et al. |
| 7,704,377 B2 | | 4/2010 | Duddy et al. |
| 7,938,952 B2 | | 5/2011 | Colyar et al. |
| 8,926,824 B2 | | 1/2015 | Morel |
| 9,005,430 B2 | | 4/2015 | Fournier et al. |
| 9,840,674 B2 | | 12/2017 | Weiss et al. |
| 2006/0287561 A1 | * | 12/2006 | Choi ............... C10G 57/00 585/324 |
| 2007/0090018 A1 | | 4/2007 | Keusenkothen et al. |
| 2008/0093262 A1 | | 4/2008 | Gragnani et al. |
| 2009/0173665 A1 | | 7/2009 | Zhou et al. |
| 2009/0288985 A1 | * | 11/2009 | Long ............... C10G 11/18 208/57 |
| 2009/0299118 A1 | * | 12/2009 | Claude ............... B01J 29/90 585/653 |
| 2011/0073523 A1 | | 3/2011 | Cui et al. |
| 2013/0026065 A1 | | 1/2013 | Koseoglu |
| 2014/0299515 A1 | | 10/2014 | Weiss et al. |
| 2016/0122666 A1 | | 5/2016 | Weiss et al. |

FOREIGN PATENT DOCUMENTS

| | | |
|---|---|---|
| EP | 0909804 A2 | 4/1999 |
| GB | 2162082 A | 1/1986 |
| JP | 2005-200631 | 7/2005 |
| JP | 2007-527937 | 10/2007 |
| JP | 2008-544061 | 12/2008 |
| WO | 0244306 A1 | 6/2002 |
| WO | 2007055488 A1 | 5/2007 |
| WO | 2010102712 A2 | 6/2010 |
| WO | WO 2016/146326 | 9/2016 |

OTHER PUBLICATIONS

English Abstract of WO2010102712(A2); Date of Publication: Sep. 19, 2010; 2 Pages.
International Patent Publication No. 2010102712; Date of Publication: Sep. 16, 2010; Abstract Only, 2 pages.
International Search Report for International Application No. PCT/EP2014/063850; dated Jul. 25, 2014; 4 pages.
Kirk-Othmer Encyclopedia of Chemical Technology, Petroluem Refinery Processes, Fifth Edition, vol. 18, Wiley-Interscience (2006); 46 Pages.
Table VI, p. 295, Pyrolysis: Theory and Industrial Practice by Lyle F. Albright et al., Academic Press 1983.
Written Opinion of the International Searching Authority for International Application No. PCT/EP2014/063850; dated Jul. 25, 2014; 6 pages.
Office Action issued in Japanese Patent Application No. 2015-522560, dated Feb. 20, 2018.

* cited by examiner

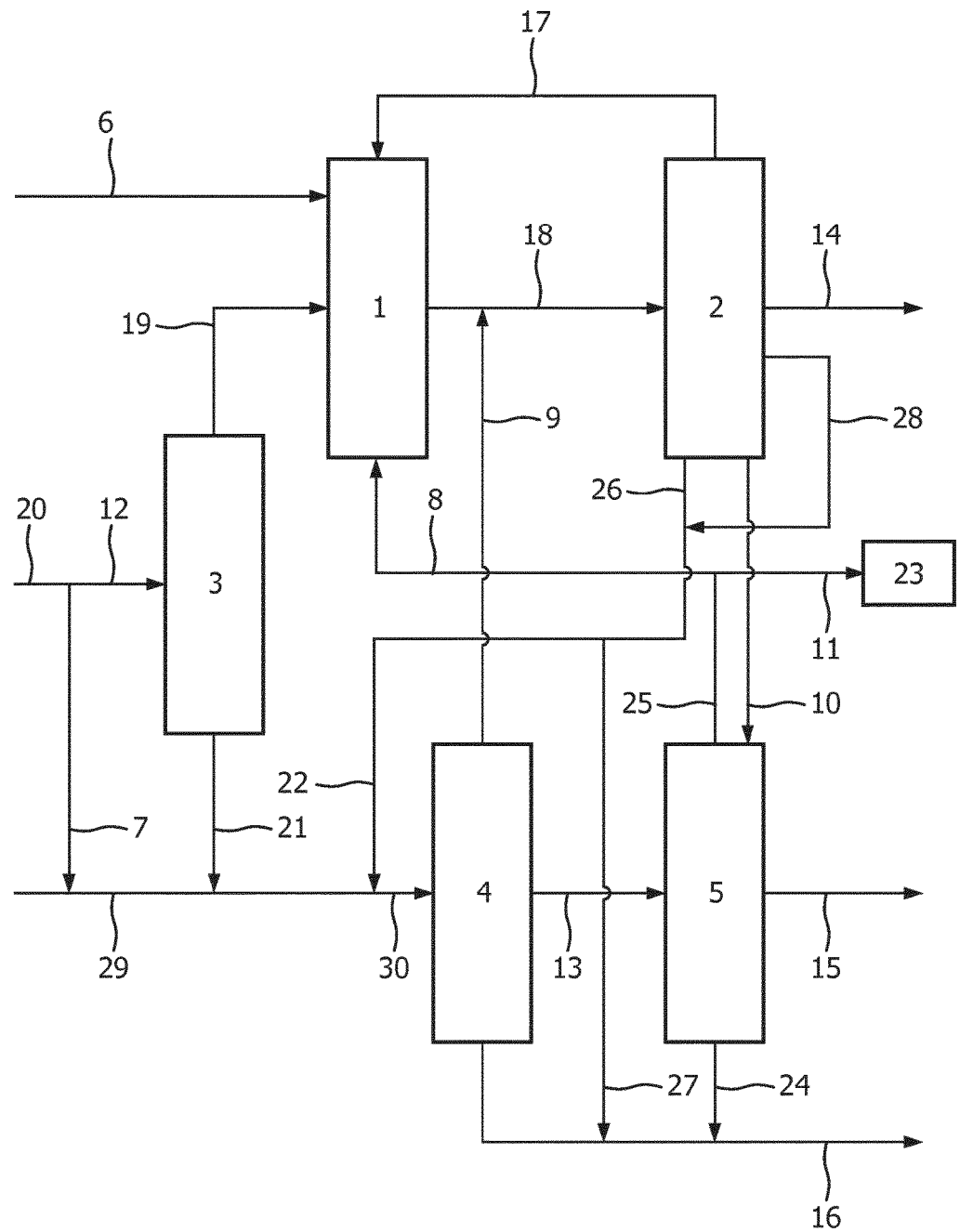

PROCESS FOR THE PRODUCTION OF LIGHT OLEFINS AND AROMATICS FROM A HYDROCARBON FEEDSTOCK

CROSS REFERENCE TO RELATED APPLICATIONS

This application is a National Stage application of PCT/EP2014/063850, filed Jun. 30, 2014, which claims the benefit of European Application No. 13174765.1, filed Jul. 2, 2013, both of which are incorporated by reference in their entirety herein.

The present invention relates to a process for the production of light olefins and aromatics from a hydrocarbon feedstock.

Conventionally, crude oil is processed, via distillation, into a number of cuts such as naphtha, gas oils and residua. Each of these cuts has a number of potential uses such as for producing transportation fuels such as gasoline, diesel and kerosene or as feeds to some petrochemicals and other processing units.

Light crude oil cuts such a naphthas and some gas oils can be used for producing light olefins and single ring aromatic compounds via processes such as steam cracking in which the hydrocarbon feed stream is evaporated and diluted with steam then exposed to a very high temperature (800° C. to 860° C.) in short residence time (<1 second) furnace (reactor) tubes. In such a process the hydrocarbon molecules in the feed are transformed into (on average) shorter molecules and molecules with lower hydrogen to carbon ratios (such as olefins) when compared to the feed molecules. This process also generates hydrogen as a useful by-product and significant quantities of lower value co-products such as methane and C9+ Aromatics and condensed aromatic species (containing two or more aromatic rings which share edges).

Typically, the heavier (or higher boiling point) higher aromatic content streams, such as residua are further processed in a crude oil refinery to maximize the yields of lighter (distillable) products from the crude oil. This processing can be carried out by processes such as hydro-cracking (whereby the hydro-cracker feed is exposed to a suitable catalyst under conditions which result in some fraction of the feed molecules being broken into shorter hydrocarbon molecules with the simultaneous addition of hydrogen). Heavy refinery stream hydrocracking is typically carried out at high pressures and temperatures and thus has a high capital cost.

An aspect of such a combination of crude oil distillation and steam cracking of the lighter distillation cuts is the capital and other costs associated with the fractional distillation of crude oil. Heavier crude oil cuts (i.e. those boiling beyond ~350° C.) are relatively rich in substituted aromatic species and especially substituted condensed aromatic species (containing two or more aromatic rings which share edges) and under steam cracking conditions these materials would yield substantial quantities of heavy by products such as C9+ aromatics and condensed aromatics. Hence, a consequence of the conventional combination of crude oil distillation and steam cracking is that a substantial fraction of the crude oil is not processed via the steam cracker as the cracking yield of valuable products from heavier cuts is not considered to be sufficiently high, or at least when compared to alternative refinery value.

Another aspect of the technology discussed above is that even when only light crude oil cuts (such as naphtha) are processed via steam cracking a significant fraction of the feed stream is converted into low value heavy by-products such as C9+ aromatics and condensed aromatics. With typical naphthas and gas oils these heavy by-products might constitute 2 to 25% of the total product yield (Table VI, Page 295, Pyrolysis: Theory and Industrial Practice by Lyle F. Albright et al, Academic Press, 1983). Whilst this represents a significant financial downgrade of expensive naphtha in lower value material on the scale of a conventional steam cracker the yield of these heavy by-products to does not typically justify the capital investment required to up-grade these materials (e.g. by hydrocracking) into streams that might produce significant quantities of higher value chemicals. This is partly because hydrocracking plants have high capital costs and, as with most petrochemicals processes, the capital cost of these units typically scales with throughput raised to the power of 0.6 or 0.7. Consequently, the capital costs of a small scale hydro-cracking unit are normally considered to be too high to justify such an investment to process steam cracker heavy by-products.

Another aspect of the conventional hydrocracking of heavy refinery streams such as residua is that this is typically carried out under compromise conditions chosen to achieve the desired overall conversion. As the feed streams contain a mixture of species with a range of ease of cracking this result in some fraction of the distillable products formed by hydrocracking of relatively easily hydrocracked species being further converted under the conditioned necessary to hydrocrack more difficult to hydrocrack species. This increases the hydrogen consumption and heat management difficulties associated with the process and also increases the yield of light molecules such as methane at the expense of more valuable species.

A feature of such a combination of crude oil distillation and steam cracking of the lighter distillation cuts is that steam cracking furnace tubes, including convection and radiation section tubing, are typically unsuitable for the processing of cuts which contain significant quantities of material with a boiling point greater than ~350° C. as it is difficult to ensure complete evaporation of these cuts prior to exposing the mixed hydrocarbon and steam stream to the high temperatures required to promote thermal cracking. If droplets of liquid hydrocarbon are present in the hot sections of cracking tubes fouling and/or coke is rapidly deposited on the tube surface which reduces heat transfer and increases pressure drop and ultimately limits the operation of the cracking tube necessitating a shut-down of the furnace to allow for decoking. Due to this difficulty a significant proportion of the original crude oil cannot be processed into light olefins and aromatic species via a steam cracker.

US2009173665 relates to a catalyst and process for increasing the monoaromatics content of hydrocarbon feedstocks that include polynuclear aromatics, wherein the increase in monoaromatics can be achieved with an increase in gasoline/diesel yields and while reducing unwanted compounds thereby providing a route for upgrading hydrocarbons that include significant quantities of polynuclear aromatics.

US2006287561 relates to a process for increasing the production of C2-C4 light olefin hydrocarbons by integrating a process for producing an aromatic hydrocarbon mixture and liquefied petroleum gas (LPG) from a hydrocarbon mixture and a process for producing a hydrocarbon feedstock which is capable of being used as a feedstock in the former process. US2006287561 teaches feeding a hydrocarbon feedstock into a pyrolysis furnace to conduct a pyrolysis reaction and separating reaction products, which are generated from the pyrolysis reaction, into a stream containing hydrogen and C4 or lower hydrocarbons, and a stream containing C5+ hydrocarbons, through a compression and fractionation process, wherein the overhead stream from a hydrocracker is fed into the compression and fractionation unit of the pyrolysis process, thereby being recycled.

US2007090018 relates to a method of making olefins from a crude or resid-containing crude fraction wherein a hydroprocessing effluent containing a resid fraction therein is used as steam cracker feed, especially a process integrating hydrogenation of a resid-containing material with steam cracking to obtain an olefins product.

U.S. Pat. No. 3,842,138 relates to a method of thermal cracking in the presence of hydrogen of a charge of hydrocarbons of petroleum wherein the hydrocracking process is carried out under a pressure of 5 and 70 bars at the outlet of the reactor with very short residence times of 0.01 and 0.5 second and a temperature range at the outlet of the reactor extending from 625 to 1000° C. Catalytic cracking of light hydrocarbon fractions such as naphtha is known technology in a refinery context. As such the process is aimed at producing light olefins (particularly propylene) and has an unconverted/liquid product (FCC naphtha and heavier) that normally would go into the fuel pool often after further treating. An aspect of using this technology in a petrochemicals complex is the lack of (desire for) such an outlet for this material and its low quality due to the presence of unsaturated and/or higher (substituted) aromatic species other than BTX (e.g. naphthalene).

An object of the present invention is to provide a method for upgrading naphtha to aromatics and LPG cracker feeds.

Another object of the present invention is to provide a process for the production of light olefins and aromatics from a hydrocarbon feedstock in which a high yield of ethylene and propylene can be attained.

Another object of the present invention is to provide a process for the production of light olefins and aromatics from a hydrocarbon feedstock in which a broad spectrum of hydrocarbon feedstocks can be processed, i.e. a high feed flexibility.

Another object of the present invention is to provide a process for the production of light olefins and aromatics from a hydrocarbon feedstock in which an improved yield of aromatics can be attained.

The present invention relates to a process for the production of light olefins and aromatics from a hydrocarbon feedstock, comprising the following steps of:

(a) feeding a hydrocarbon feedstock into a FCC unit (b) separating reaction products, which are generated from the FCC reaction, into a bottom stream, and middle stream and a top stream;

(c) feeding the middle stream from (b) to a gasoline hydrocracker (GHC) unit, (d) separating reaction products of said GHC of step (c) into an overhead gas stream comprising hydrogen, methane and C2-C4 paraffins, and a bottom stream comprising aromatic hydrocarbon compounds, (e) feeding the overhead stream from the gasoline hydrocracker (GHC) unit into a steam cracker unit.

On basis of these steps (a)-(e) one or more of the objects can be attained. The present inventors found that by combining the GHC technology with such a FCC reactor the liquid product can be directly further upgraded to light aromatics (BTX) and high value steam cracker feed LPG. In addition synergy with or improvement over the existing technology is obtained as naphthenic species will be converted to BTX which is not the case in for example hydrocracker upgrading of the liquid product. A high purity BTX product is directly obtained. Longer side-chains on aromatics will be upgraded to light olefins (i.e. rather than having higher carbon number mono-aromatics, these components are basically split/converted into high value cracker feed LPG and BTX).

An advantage of the process according to the present invention over the traditional steam cracking is that a higher yield of ethylene and propylene and BTX is achieved i.e. a higher carbon efficiency/high value chemicals production. In addition typical P/E ratio values for this type of FCC are approximately at equal propylene and ethylene yields (a value of 1) and this allows operating outside of the normally imposed typical steam cracker P/E ratio.

Furthermore, the present parallel naphtha processing routes via both steam cracking furnaces and FCC technology allows for much better control over the P/E ratio without negatively impacting the co-product benefits. Control can be via distribution of the feed over these two routes and/or feed blending and a higher degree of freedom/optimization in feed purchasing opportunities as bottlenecks can be more efficiently avoided. This allows for the C2 and C3 bottlenecks to be simultaneously met at any time to maximize profit.

The present inventors found that a FCC process is more forgiving to such difficult to evaporate/fouling components (at the cost of some coke formation on the catalyst; capable to deal with this due to continuous regeneration). This results in an increased operating window for heavy tail type of feeds (gas condensates and contaminated naphtha) as the FCC process is more forgiving for high boiling components that result in fouling due to too late evaporation or inability to be evaporated compared to a steam cracking furnace. Heavy components will either be converted in coke formed on the catalyst (with continuous regeneration therefore less of a problem) or upgraded to lighter (crackable) components.

According to the present invention such a limitation of steam cracking can be avoided by having a splitter to separate the naphtha and/or heavy gas condensate and similar streams (including gas oils, crude contaminated naphtha/gas condensate et cetera) into a crackable light naphtha and a bottom heavier naphtha or heavy tail naphtha/gas oil bottom product that is send to the FCC. The cut-point for the splitter allows controlling the loading and feed flexibility for the two different processing routes. The liquid product of the FCC unit is preferably sent to the GHC upgrading unit. In an embodiment of the present invention BTX is produced in the GHC unit and the LPG produced is send to the steam cracker to yield high olefin yields. In essence the present splitter allows producing a specific feed for the FCC unit and maximizes feed flexibility by processing the more difficult part of the feed in the FCC unit and the rest of material balanced in steam cracker or FCC for optimal ethylene and propylene production. At the same time heavier feeds than normally steam cracked can directly be fed to the FCC unit as well. On basis of the present process the total yield in light olefins (ethylene and propylene) is also expected to be higher compared to traditional steam cracking. Depending on the feed composition the FCC will vary between e.g. the Advanced Catalytic Olefins (ACO) unit, a process for enabling increased propylene production from paraffinic feeds, and a more traditional FCC unit for resid upgrading.

The process according to the invention further comprises pretreating the hydrocarbon feedstock in a distillation unit, from which distillation unit its bottom stream is fed into said FCC unit and its overhead stream is fed into said steam cracker unit. Such a distillation is especially preferred when using specific types of feeds comprising components that can't be directly steam cracked without any further break down of molecular structure. In an embodiment of using a distillation column it is thus possible to send the bottom stream from the distillation column directly to the FCC unit, or to mix the bottom stream with another type of feedstock first and then send the mixture thus obtained to the FCC unit.

As mentioned before, in the gasoline hydrocracker (GHC) an overhead gas stream is produced, which overhead gas stream has a high content of C2-C4 paraffins. This overhead gas stream is sent to a steam cracking unit. According to a preferred embodiment the C2-C4 paraffins from said overhead gas stream coming from the gasoline hydrocracker (GHC) unit are first separated and then the C2-C4 paraffins thus separated from the overhead gas stream are fed to the furnace section of a steam cracker unit.

According to another preferred embodiment the C2-C4 paraffins are separated in individual streams, wherein each stream predominantly comprises C2 paraffins, C3 paraffins and C4 paraffins, respectively. These individual streams which can be qualified as streams having a high purity content of specific paraffin, are fed to a specific furnace section of said steam cracker unit.

The present invention further comprises in a preferred embodiment the separation of reaction products of said steam cracking unit into an overhead stream, which contains hydrogen, methane and ethane, a middle stream, which contains C2=, C3= and C4=, and a first bottom stream comprising C9+ hydrocarbons, and a second bottom stream comprising aromatic hydrocarbon compounds and non-aromatic hydrocarbon compounds.

From economical and technical reasons it is preferred to return not only said overhead stream to said steam cracking unit, but C3+ alkanes as well.

According to a preferred embodiment the present method further comprises feeding said second bottom stream into said gasoline hydrocracker (GHC) unit.

It is also preferred to feed said first bottom stream into said FCC unit, preferably by first combining said first bottom stream with a hydrogen donor type feedstock and then feeding the thus combined materials to said FCC unit. The first bottom stream, which comprises C9+ hydrocarbons, can be qualified as a hydrogen deficient material so it is preferred to add a hydrogen donor type material before feeding the first bottom stream to the FCC unit. Examples of the hydrogen donor type feedstock are hydrogen or a light feedstock, such as naphtha, or a combination thereof.

The process further comprises separating the bottom stream from reaction products of said gasoline hydrocracker (GHC) unit in a BTX rich fraction and in heavy cycle oil (HCO) fraction, wherein according to a preferred embodiment the present process further comprises combining one or more of streams chosen from the group of the first bottom stream from the FCC unit, heavy cycle oil (HCO) fraction and bottom stream of the reaction products of the steam cracking unit.

According to a preferred embodiment especially the C3-C4 fraction of said overhead stream from the gasoline hydrocracker (GHC) unit is fed to a dehydrogenation unit. Such a C3-C4 fraction can be separate C3 streams and C4 streams, but also combined C3 and C4 streams. Processes for the dehydrogenation of lower alkanes such as propane and butanes are described as lower alkane dehydrogenation process. The term "propane dehydrogenation unit" relates to a petrochemical process unit wherein a propane feedstream is converted into a product comprising propylene and hydrogen. Accordingly, the term "butane dehydrogenation unit" relates to a process unit for converting a butane feedstream into C4 olefins. The present process further comprises combing the top stream from the FCC unit with the stream of reaction products from the steam cracking unit.

Examples of preferred hydrocarbon feedstocks into the FCC unit are chosen from the group of group of naphtha, kerosene, diesel, atmospheric gas oil (AGO), gas condensates, waxes, crude contaminated naphtha, vacuum gas oil (VGO), vacuum residue, atmospheric residue, pretreated naphtha, or a combination thereof.

The process conditions prevailing in the FCC unit can be found in the claims. The process conditions prevailing in said gasoline hydrocracker (GHC) unit are a temperature of 300-450° C., a pressure of 300-5000 kPa gauge and a Weight Hourly Space Velocity of 0.1-10 h−1, preferably a temperature of 300-400° C., a pressure of 600-3000 kPa gauge and a Weight Hourly Space Velocity of 0.2-2 h−1. The process conditions prevailing in said steam cracking unit can be found in the claims.

Examples of feedstocks that can be processed directly in the steam cracking unit are naphtha and gas condensates.

The present invention further relates to the use of a gaseous light fraction of a multi stage FCC and hydrocracked hydrocarbon feedstock as a feedstock for a steam cracking unit.

The term "crude oil" as used herein refers to the petroleum extracted from geologic formations in its unrefined form. Any crude oil is suitable as the source material for the process of this invention, including Arabian Heavy, Arabian Light, other Gulf crudes, Brent, North Sea crudes, North and West African crudes, Indonesian, Chinese crudes and mixtures thereof, but also shale oil, tar sands and bio-based oils. The crude oil used as feed to the process of the present invention preferably is conventional petroleum having an API gravity of more than 20° API as measured by the ASTM D287 standard. More preferably, the crude oil used in the process of the present invention is a light crude oil having an API gravity of more than 30° API. Most preferably, the crude oil used in the process of the present invention comprises Arabian Light Crude Oil. Arabian Light Crude Oil typically has an API gravity of between 32-36° API and a sulfur content of between 1.5-4.5 wt-%.

The term "petrochemicals" or "petrochemical products" as used herein relates to chemical products derived from crude oil that are not used as fuels. Petrochemical products include olefins and aromatics that are used as a basic feedstock for producing chemicals and polymers. High-value petrochemicals include olefins and aromatics. Typical high-value olefins include, but are not limited to, ethylene, propylene, butadiene, butylene-1, isobutylene, isoprene, cyclopentadiene and styrene. Typical high-value aromatics include, but are not limited to, benzene, toluene, xylene and ethyl benzene.

The term "fuels" as used herein relates to crude oil-derived products used as energy carrier. Unlike petrochemicals, which are a collection of well-defined compounds, fuels typically are complex mixtures of different hydrocarbon compounds. Fuels commonly produced by oil refineries include, but are not limited to, gasoline, jet fuel, diesel fuel, heavy fuel oil and petroleum coke.

The term "gases produced by the crude distillation unit" or "gases fraction" as used herein refers to the fraction obtained in a crude oil distillation process that is gaseous at ambient temperatures. Accordingly, the "gases fraction" derived by crude distillation mainly comprises C1-C4 hydrocarbons and may further comprise impurities such as hydrogen sulfide and carbon dioxide. In this specification, other petroleum fractions obtained by crude oil distillation are referred to as "naphtha", "kerosene", "gasoil" and "resid". The terms naphtha, kerosene, gasoil and resid are used herein having their generally accepted meaning in the field of petroleum refinery processes; see Alfke et al. (2007) Oil Refining, Ullmann's Encyclopedia of Industrial Chemistry and Speight (2005) Petroleum Refinery Processes, Kirk-Othmer Encyclopedia of Chemical Technology. In this respect, it is to be noted that there may be overlap between the different crude oil distillation fractions due to the complex mixture of the hydrocarbon compounds comprised in the crude oil and the technical limits to the crude oil distillation process. Preferably, the term "naphtha" as used herein relates to the petroleum fraction obtained by crude oil distillation having a boiling point range of about 20-200° C., more preferably of about 30-190° C. Preferably, light naphtha is the fraction having a boiling point range of about 20-100° C., more preferably of about 30-90° C. Heavy naphtha preferably has a boiling point range of about 80-200° C., more preferably of about 90-190° C. Preferably, the term "kerosene" as used herein relates to the petroleum fraction obtained by crude oil distillation having a boiling point range of about 180-270° C., more preferably of about 190-260° C. Preferably, the term "gasoil" as used herein relates to the petroleum fraction obtained by crude oil distillation having a boiling point range of about 250-360° C., more preferably of about 260-350° C. Preferably, the term "resid" as used herein relates to the petroleum fraction obtained by crude oil distillation having a boiling point of more than about 340° C., more preferably of more than about 350° C.

As used herein, the term "refinery unit" relates to a section of a petrochemical plant complex for the conversion of crude oil to petrochemicals and fuels. In this respect, it is to be noted that a unit for olefins synthesis, such as a steam cracker, is also considered to represent a "refinery unit". In this specification, different hydrocarbons streams produced by refinery units or produced in refinery unit operations are referred to as: refinery unit-derived gases, refinery unit-derived light-distillate, refinery unit-derived middle-distillate and refinery unit-derived heavy-distillate. The term "refinery unit-derived gases" relates to the fraction of the products produced in a refinery unit that is gaseous at ambient temperatures. Accordingly, the refinery unit-derived gas stream may comprise gaseous compounds such as LPG and methane. Other components comprised in the refinery unit-derived gas stream may be hydrogen and hydrogen sulfide. The terms light-distillate, middle-distillate and heavy-distillate are used herein having their generally accepted meaning in the field of petroleum refinery processes; see Speight, J. G. (2005) loc.cit. In this respect, it is to be noted that there may be overlap between different distillation fractions due to the complex mixture of the hydrocarbon compounds comprised in the product stream produced by refinery unit operations and the technical limits to the distillation process used to separate the different fractions. Preferably, the refinery-unit derived light-distillate is the hydrocarbon distillate obtained in a refinery unit process having a boiling point range of about 20-200° C., more preferably of about 30-190° C. The "light-distillate" is often relatively rich in aromatic hydrocarbons having one aromatic ring. Preferably, the refinery-unit derived middle-distillate is the hydrocarbon distillate obtained in a refinery unit process having a boiling point range of about 180-360° C., more preferably of about 190-350° C. The "middle-distillate" is relatively rich in aromatic hydrocarbons having two aromatic rings. Preferably, the refinery-unit derived heavy-distillate is the hydrocarbon distillate obtained in a refinery unit process having a boiling point of more than about 340° C., more preferably of more than about 350° C. The "heavy-distillate" is relatively rich in hydrocarbons having condensed aromatic rings.

The term "aromatic hydrocarbons" or "aromatics" is very well known in the art. Accordingly, the term "aromatic hydrocarbon" relates to cyclically conjugated hydrocarbon with a stability (due to delocalization) that is significantly greater than that of a hypothetical localized structure (e.g. Kekulé structure). The most common method for determining aromaticity of a given hydrocarbon is the observation of diatropicity in the 1H NMR spectrum, for example the presence of chemical shifts in the range of from 7.2 to 7.3 ppm for benzene ring protons.

The terms "naphthenic hydrocarbons" or "naphthenes" or "cycloalkanes" is used herein having its established meaning and accordingly relates types of alkanes that have one or more rings of carbon atoms in the chemical structure of their molecules.

The term "olefin" is used herein having its well-established meaning. Accordingly, olefin relates to an unsaturated hydrocarbon compound containing at least one carbon-carbon double bond. Preferably, the term "olefins" relates to a mixture comprising two or more of ethylene, propylene, butadiene, butylene-1, isobutylene, isoprene and cyclopentadiene.

The term "LPG" as used herein refers to the well-established acronym for the term "liquefied petroleum gas". LPG generally consists of a blend of C2-C4 hydrocarbons i.e. a mixture of C2, C3, and C4 hydrocarbons.

The term "BTX" as used herein relates to a mixture of benzene, toluene and xylenes.

As used herein, the term "C# hydrocarbons", wherein "#" is a positive integer, is meant to describe all hydrocarbons having # carbon atoms. Moreover, the term "C#+ hydrocarbons" is meant to describe all hydrocarbon molecules having # or more carbon atoms. Accordingly, the term "C5+ hydrocarbons" is meant to describe a mixture of hydrocarbons having 5 or more carbon atoms. The term "C5+ alkanes" accordingly relates to alkanes having 5 or more carbon atoms.

As used herein, the term "crude distillation unit" or "crude oil distillation unit" relates to the fractionating column that is used to separate crude oil into fractions by fractional distillation; see Alfke et al. (2007) loc.cit. Preferably, the crude oil is processed in an atmospheric distillation unit to separate gas oil and lighter fractions from higher boiling components (atmospheric residuum or "resid"). In the present invention, it is not required to pass the resid to a vacuum distillation unit for further fractionation of the resid, and it is possible to process the resid as a single fraction. In case of relatively heavy crude oil feeds, however, it may be advantageous to further fractionate the resid using a vacuum distillation unit to further separate the resid into a vacuum gas oil fraction and vacuum residue fraction. In case vacuum distillation is used, the vacuum gas oil fraction and vacuum residue fraction may be processed separately in the subsequent refinery units. For instance, the vacuum residue fraction may be specifically subjected to solvent deasphalting before further processing.

As used herein, the term "hydrocracker unit" or "hydrocracker" relates to a refinery unit in which a hydrocracking process is performed i.e. a catalytic cracking process assisted by the presence of an elevated partial pressure of hydrogen; see e.g. Alfke et al. (2007) loc.cit. The products of this process are saturated hydrocarbons and, depending on the reaction conditions such as temperature, pressure and space velocity and catalyst activity, aromatic hydrocarbons including BTX. The process conditions used for hydrocracking generally includes a process temperature of 200-600° C., elevated pressures of 0.2-20 MPa, space velocities between 0.1-10 h−1.

Hydrocracking reactions proceed through a bifunctional mechanism which requires a acid function, which provides for the cracking and isomerization and which provides breaking and/or rearrangement of the carbon-carbon bonds comprised in the hydrocarbon compounds comprised in the feed, and a hydrogenation function. Many catalysts used for the hydrocracking process are formed by composting various transition metals, or metal sulfides with the solid support such as alumina, silica, alumina-silica, magnesia and zeolites.

As used herein, the term "gasoline hydrocracking unit" or "GHC" refers to a refinery unit for performing a hydrocracking process suitable for converting a complex hydrocarbon feed that is relatively rich in aromatic hydrocarbon compounds-such as refinery unit-derived light-distillate including, but not limited to, reformer gasoline, FCC gasoline and pyrolysis gasoline (pygas)- to LPG and BTX, wherein said process is optimized to keep one aromatic ring intact of the aromatics comprised in the GHC feedstream, but to remove most of the side-chains from said aromatic ring. Accordingly, the main product produced by gasoline hydrocracking is BTX and the process can be optimized to provide chemicals-grade BTX. Preferably, the hydrocarbon feed that is subject to gasoline hydrocracking comprises refinery unit-derived light-distillate. More preferably, the hydrocarbon feed that is subjected to gasoline hydrocracking preferably does not comprise more than 1 wt-% of hydrocarbons having more than one aromatic ring. Preferably, the gasoline hydrocracking conditions include a temperature of 300-580° C., more preferably of 450-580° C. and even more preferably of 470-550° C. Lower temperatures must be avoided since hydrogenation of the aromatic ring becomes favourable. However, in case the catalyst comprises a further element that reduces the hydrogenation activity of the catalyst, such as tin, lead or bismuth, lower temperatures may be selected for gasoline hydrocracking; see e.g. WO 02/44306 A1 and WO 2007/055488. In case the reaction temperature is too high, the yield of LPG's (especially propane and butanes) declines and the yield of methane rises. As the catalyst activity may decline over the lifetime of the catalyst, it is advantageous to increase the reactor temperature gradually over the life time of the catalyst to maintain the hydrocracking conversion rate. This means that the optimum temperature at the start of an operating cycle preferably is at the lower end of the hydrocracking temperature range. The optimum reactor temperature will rise as the catalyst deactivates so that at the end of a cycle (shortly before the catalyst is replaced or regenerated) the temperature preferably is selected at the higher end of the hydrocracking temperature range.

Preferably, the gasoline hydrocracking of a hydrocarbon feedstream is performed at a pressure of 0.3-5 MPa gauge, more preferably at a pressure of 0.6-3 MPa gauge, particularly preferably at a pressure of 1-2 MPa gauge and most preferably at a pressure of 1.2-1.6 MPa gauge. By increasing reactor pressure, conversion of C5+ non-aromatics can be increased, but this also increases the yield of methane and the hydrogenation of aromatic rings to cyclohexane species which can be cracked to LPG species. This results in a reduction in aromatic yield as the pressure is increased and, as some cyclohexane and its isomer methylcyclopentane, are not fully hydrocracked, there is an optimum in the purity of the resultant benzene at a pressure of 1.2-1.6 MPa.

Preferably, gasoline hydrocracking of a hydrocarbon feedstream is performed at a Weight Hourly Space Velocity (WHSV) of 0.1-10 h−1, more preferably at a Weight Hourly Space Velocity of 0.2-6 h−1 and most preferably at a Weight Hourly Space Velocity of 0.4-2 h−1. When the space velocity is too high, not all BTX co-boiling paraffin components are hydrocracked, so it will not be possible to achieve BTX specification by simple distillation of the reactor product. At too low space velocity the yield of methane rises at the expense of propane and butane. By selecting the optimal Weight Hourly Space Velocity, it was surprisingly found that sufficiently complete reaction of the benzene co-boilers is achieved to produce on spec BTX without the need for a liquid recycle.

Accordingly, preferred gasoline hydrocracking conditions thus include a temperature of 450-580° C., a pressure of 0.3-5 MPa gauge and a Weight Hourly Space Velocity of 0.1-10 h−1. More preferred gasoline hydrocracking conditions include a temperature of 470-550° C., a pressure of 0.6-3 MPa gauge and a Weight Hourly Space Velocity of 0.2-6 h−1. Particularly preferred gasoline hydrocracking conditions include a temperature of 470-550° C., a pressure of 1-2 MPa gauge and a Weight Hourly Space Velocity of 0.4-2 h−1.

As used herein, the term "fluid catalytic cracker unit" or "FCC unit" relates to a refinery unit to convert high-boiling, high-molecular weight hydrocarbon fractions of petroleum crude oils to lower boiling point hydrocarbon fractions and olefinic gases. In a FCC unit, cracking takes place generally using a very active zeolite-based catalyst in a short-contact time vertical or upward-sloped pipe called the "riser". Preheated feed is sprayed into the base of the riser via feed nozzles where it contacts extremely hot fluidized catalyst. Preferred process conditions used for fluid catalytic cracking generally include a temperature of 425-700° C. and a pressure of 10-800 kPa gauge. The hot catalyst vaporizes the feed and catalyzes the cracking reactions that break down the high-molecular weight hydrocarbons into lighter components including LPG, light-distillate and middle-distillate. The catalyst/hydrocarbon mixture flows upward through the riser for a few seconds, and then the mixture is separated via cyclones. The catalyst-free hydrocarbons are routed to a main fractionator (a component of the FCC unit for separation into fuel gas, LPG, light distillate, middle distillate and heavy-distillate). "Spent" catalyst is disengaged from the cracked hydrocarbon vapors and sent to a stripper where it is contacted with steam to remove hydrocarbons remaining in the catalyst pores. The "spent" catalyst then flows into a fluidized-bed regenerator where air (or in some cases air plus oxygen) is used to burn off the coke to restore catalyst activity and also provide the necessary heat for the next reaction cycle, cracking being an endothermic reaction. The "regenerated" catalyst then flows to the base of the riser, repeating the cycle. The process of the present invention may comprise several FCC units operated at different process conditions, depending on the hydrocarbon feed and the desired product slate. As used herein, the term "low-severity FCC" or "refinery FCC" relates to a FCC process that is optimized towards the production of light-distillate that is relatively rich in aromatics ("FCC-gasoline"). As most conventional refineries are optimized towards gasoline production, conventional FCC process operating conditions can be considered to represent low-severity FCC. Preferred process conditions used for refinery FCC generally include a temperature of 425-570° C. and a pressure of 10-800 kPa gauge.

As used herein, the term "high-severity FCC" or "petrochemicals FCC" relates to a FCC process that is optimized towards the production of olefins. High-severity FCC processes are known from the prior art and are inter alia described in EP 0 909 804 A2, EP 0 909 582 A1 and U.S. Pat. No. 5,846,402. Preferred process conditions used for high-severity FCC generally include a temperature of 540-700° C. and a pressure of 10-800 kPa gauge.

The process of the present invention may require removal of sulfur from certain crude oil fractions to prevent catalyst deactivation in downstream refinery processes, such as catalytic reforming or fluid catalytic cracking. Such a hydrodesulfurization process is performed in a "HDS unit" or "hydrotreater"; see Alfke (2007) loc. cit. Generally, the hydrodesulfurization reaction takes place in a fixed-bed reactor at elevated temperatures of 200-425° C., preferably of 300-400° C. and elevated pressures of 1-20 MPa gauge, preferably 1-13 MPa gauge in the presence of a catalyst comprising elements selected from the group consisting of Ni, Mo, Co, W and Pt, with or without promoters, supported on alumina, wherein the catalyst is in a sulfide form.

In a further embodiment, the process of the present invention further comprises a hydrodealkylation step wherein the BTX (or only the toluene and xylenes fraction of said BTX produced) is contacted with hydrogen under conditions suitable to produce a hydrodealkylation product stream comprising benzene and fuel gas.

The process step for producing benzene from BTX may include a step wherein the benzene comprised in the hydrocracking product stream is separated from the toluene and xylenes before hydrodealkylation. The advantage of this separation step is that the capacity of the hydrodealkylation reactor is increased. The benzene can be separated from the BTX stream by conventional distillation.

Processes for hydrodealkylation of hydrocarbon mixtures comprising C6-C9 aromatic hydrocarbons are well known in the art and include thermal hydrodealkylation and catalytic hydrodealkylation; see e.g. WO 2010/102712 A2. Catalytic hydrodealkylation is preferred in the context of the present invention as this hydrodealkylation process generally has a higher selectivity towards benzene than thermal hydrodealkylation. Preferably catalytic hydrodealkylation is employed, wherein the hydrodealkylation catalyst is selected from the group consisting of supported chromium oxide catalyst, supported molybdenum oxide catalyst, platinum on silica or alumina and platinum oxide on silica or alumina.

The process conditions useful for hydrodealkylation, also described herein as "hydrodealkylation conditions", can be easily determined by the person skilled in the art. The process conditions used for thermal hydrodealkylation are for instance described in DE 1668719 A1 and include a temperature of 600-800° C., a pressure of 3-10 MPa gauge and a reaction time of 15-45 seconds. The process conditions used for the preferred catalytic hydrodealkylation are described in WO 2010/102712 A2 and preferably include a temperature of 500-650° C., a pressure of 3.5-8 MPa gauge, preferably of 3.5-7 MPa gauge and a Weight Hourly Space Velocity of 0.5-2 h−1. The hydrodealkylation product stream is typically separated into a liquid stream (containing benzene and other aromatics species) and a gas stream (containing hydrogen, H2S, methane and other low boiling point hydrocarbons) by a combination of cooling and distillation. The liquid stream may be further separated, by distillation, into a benzene stream, a C7 to C9 aromatics stream and optionally a middle-distillate stream that is relatively rich in aromatics. The C7 to C9 aromatic stream may be fed back to reactor section as a recycle to increase overall conversion and benzene yield. The aromatic stream which contains polyaromatic species such as biphenyl, is preferably not recycled to the reactor but may be exported as a separate product stream and recycled to the integrated process as middle-distillate ("middle-distillate produced by hydrodealkylation"). The gas stream contains significant quantities of hydrogen may be recycled back the hydrodealkylation unit via a recycle gas compressor or to any other refinery unit comprised in the process of the present invention that uses hydrogen as a feed. A recycle gas purge may be used to control the concentrations of methane and H2S in the reactor feed.

As used herein, the term "gas separation unit" relates to the refinery unit that separates different compounds comprised in the gases produced by the crude distillation unit and/or refinery unit-derived gases. Compounds that may be separated to separate streams in the gas separation unit comprise ethane, propane, butanes, hydrogen and fuel gas mainly comprising methane. Any conventional method suitable for the separation of said gases may be employed in the context of the present invention. Accordingly, the gases may be subjected to multiple compression stages wherein acid gases such as CO2 and H2S may be removed between compression stages. In a following step, the gases produced may be partially condensed over stages of a cascade refrigeration system to about where only the hydrogen remains in the gaseous phase. The different hydrocarbon compounds may subsequently be separated by distillation.

A very common process for the conversion of alkanes to olefins involves "steam cracking" or "pyrolysis". As used herein, the term "steam cracking" relates to a petrochemical process in which saturated hydrocarbons are broken down into smaller, often unsaturated, hydrocarbons such as ethylene and propylene. In steam cracking gaseous hydrocarbon feeds like ethane, propane and butanes, or mixtures thereof, (gas cracking) or liquid hydrocarbon feeds like naphtha or gasoil (liquid cracking) is diluted with steam and briefly heated in a furnace without the presence of oxygen. Typically, the reaction temperature is 750-900° C., but the reaction is only allowed to take place very briefly, usually with residence times of 50-1000 milliseconds. Preferably, a relatively low process pressure is to be selected of atmospheric up to 175 kPa gauge. Preferably, the hydrocarbon compounds ethane, propane and butanes are separately cracked in accordingly specialized furnaces to ensure cracking at optimal conditions. After the cracking temperature has been reached, the gas is quickly quenched to stop the reaction in a transfer line heat exchanger or inside a quenching header using quench oil. Steam cracking results in the slow deposition of coke, a form of carbon, on the reactor walls. Decoking requires the furnace to be isolated from the process and then a flow of steam or a steam/air mixture is passed through the furnace coils. This converts the hard solid carbon layer to carbon monoxide and carbon dioxide. Once this reaction is complete, the furnace is returned to service. The products produced by steam cracking depend on the composition of the feed, the hydrocarbon to steam ratio and on the cracking temperature and furnace residence time. Light hydrocarbon feeds such as ethane, propane, butane or light naphtha give product streams rich in the lighter polymer grade olefins, including ethylene, propylene, and butadiene. Heavier hydrocarbon (full range and heavy naphtha and gas oil fractions) also give products rich in aromatic hydrocarbons.

To separate the different hydrocarbon compounds produced by steam cracking the cracked gas is subjected to a fractionation unit. Such fractionation units are well known in the art and may comprise a so-called gasoline fractionator where the heavy-distillate ("carbon black oil") and the middle-distillate ("cracked distillate") are separated from the light-distillate and the gases. In the subsequent optional quench tower, most of the light-distillate produced by steam cracking ("pyrolysis gasoline" or "pygas") may be separated from the gases by condensing the light-distillate. Subsequently, the gases may be subjected to multiple compression stages wherein the remainder of the light distillate may be separated from the gases between the compression stages. Also acid gases (CO2 and H2S) may be removed between compression stages. In a following step, the gases produced by pyrolysis may be partially condensed over stages of a cascade refrigeration system to about where only the hydrogen remains in the gaseous phase. The different hydrocarbon compounds may subsequently be separated by simple distillation, wherein the ethylene, propylene and C4 olefins are the most important high-value chemicals produced by steam cracking. The methane produced by steam cracking is generally used as fuel gas, the hydrogen may be separated and recycled to processes that consume hydrogen, such as hydrocracking processes. The acetylene produced by steam cracking preferably is selectively hydrogenated to ethylene. The alkanes comprised in the cracked gas may be recycled to the process for olefins synthesis.

The term "propane dehydrogenation unit" as used herein relates to a petrochemical process unit wherein a propane feedstream is converted into a product comprising propylene and hydrogen. Accordingly, the term "butane dehydrogenation unit" relates to a process unit for converting a butane feedstream into C4 olefins. Together, processes for the dehydrogenation of lower alkanes such as propane and butanes are described as lower alkane dehydrogenation process. Processes for the dehydrogenation of lower alkanes are well-known in the art and include oxidative dehydrogenation processes and non-oxidative dehydrogenation processes. In an oxidative dehydrogenation process, the process heat is provided by partial oxidation of the lower alkane(s) in the feed. In a non-oxidative dehydrogenation process, which is preferred in the context of the present invention, the process heat for the endothermic dehydrogenation reaction is provided by external heat sources such as hot flue gases obtained by burning of fuel gas or steam. In a non-oxidative dehydrogenation process the process conditions generally comprise a temperature of 540-700° C. and an absolute pressure of 25-500 kPa. For instance, the UOP Oleflex process allows for the dehydrogenation of propane to form propylene and of (iso)butane to form (iso)butylene (or mixtures thereof) in the presence of a catalyst containing platinum supported on alumina in a moving bed reactor; see e.g. U.S. Pat. No. 4,827,072. The Uhde STAR process allows for the dehydrogenation of propane to form propylene or of butane to form butylene in the presence of a promoted platinum catalyst supported on a zinc-alumina spinel; see e.g. U.S. Pat. No. 4,926,005. The STAR process has been recently improved by applying the principle of oxydehydrogenation. In a secondary adiabatic zone in the reactor part of the hydrogen from the intermediate product is selectively converted with added oxygen to form water. This shifts the thermodynamic equilibrium to higher conversion and achieves a higher yield. Also the external heat required for the endothermic dehydrogenation reaction is partly supplied by the exothermic hydrogen conversion. The Lummus Catofin process employs a number of fixed bed reactors operating on a cyclical basis. The catalyst is activated alumina impregnated with 18-20 wt-% chromium; see e.g. EP 0 192 059 A1 and GB 2 162 082 A. The Catofin process has the advantage that it is robust and capable of handling impurities which would poison a platinum catalyst. The products produced by a butane dehydrogenation process depends on the nature of the butane feed and the butane dehydrogenation process used. Also the Catofin process allows for the dehydrogenation of butane to form butylene; see e.g. U.S. Pat. No. 7,622,623.

The present invention will be discussed in the next Example which example should not be interpreted as limiting the scope of protection.

The sole FIGURE provides a schematic flow sheet of an embodiment of the present invention.

EXAMPLE

The process scheme can be found in the sole FIGURE. A typical feedstock 20, for example gas condensates, is sent directly to FCC unit 4. In FCC unit 4 the long-chain molecules of the gas condensates are broken into much shorter molecules by contacting the feedstock, at high temperature and moderate pressure, with a fluidized powdered catalyst. The reaction products, which are generated from the FCC reaction, are separated into a bottom stream 16, a middle stream 13 and a top stream 9. The middle stream 13 from FCC unit 4 is sent to a gasoline hydrocracker (GHC) unit 5. The reaction products of said GHC unit 5 are separated into an overhead gas stream 25 comprising hydrogen, methane and C2-C4 paraffins, and a stream 15 comprising aromatic hydrocarbon compounds, predominantly a so-called BTX fraction and a heavy fraction 24. The overhead stream 25 from the gasoline hydrocracker (GHC) unit 5 is sent to a steam cracker unit 1. As shown in the FIGURE feedstock 20 can be fractionated in a distillation tower 3 to obtain a top stream 19. Top stream 19 can be sent to steam cracker unit 1. A bottom stream 21 from distillation tower can be sent directly to FCC unit 4 as the sole feedstock. However, it is also possible to mix bottom stream 21 with feedstock 29 and to feed the mixture thus obtained as a feedstock 30 to FCC unit 4. In a specific embodiment feedstock 20 can be divided in a stream 12 and a stream 7, wherein only stream 12 is fractionated in distillation tower 3. Such a stream 7 is sent directly to FCC unit 4. Feedstock 29 is a feed type that will not be fractionated in distillation tower 3 but will be sent directly to FCC unit 4.

Although not shown in the sole FIGURE it is possible to separate the C2-C4 paraffins from said overhead gas stream 25 coming from the gasoline hydrocracker (GHC) unit 5 and to feed said C2-C4 paraffins thus separated from the overhead gas stream 25 to the furnace section of a steam cracker unit 1. Moreover, it is also possible to separate the C2-C4 paraffins in individual streams, each stream predominantly comprising C2 paraffins, C3 paraffins and C4 paraffins, respectively, and feeding each individual stream to a specific furnace section of said steam cracker unit 1. The reaction products 18 of said steam cracking unit 1 are separated in separation section 2 into an overhead stream 17, which contains C2-C6 alkanes, a middle stream 14, which contains C2-olefins, C3-olefins and C4-olefins, and a first bottom stream 26 comprising C9+ hydrocarbons, and a second bottom stream 10 comprising aromatic hydrocarbon compounds and non-aromatic hydrocarbon compounds. The overhead stream 17 is returned to steam cracking unit 1. The second bottom stream 10 is sent to the gasoline hydrocracker (GHC) unit 5. The second bottom stream 10 comprises pygas, C5-C8. From separator 2 also hydrogen and methane can be recovered as separate streams and re-used elsewhere.

The first bottom stream 26 is sent to the FCC unit 4, preferably by first combining first bottom stream 26 with a hydrogen donor type feedstock and then feeding the thus combined materials to said FCC unit 4. Examples of the hydrogen donor type feedstock is hydrogen 28 or a light feedstock 7, 20, such as naphtha, or a combination thereof. After mixing the recycled hydrogen 28 from the separation section 2 with the first bottom stream 26 the mixed stream 22 is sent to the FCC unit 4. The mixed stream 22 can be further mixed with other types of feedstock, such as streams 20, 29 and 21. In another embodiment (not shown) a part of first bottom stream 26 can be sent to the gasoline hydrocracker (GHC) unit 5.

The overhead stream 25 from the gasoline hydrocracker (GHC) unit 5 can be divided into two streams 8 and 11, wherein stream 11 is sent to a dehydrogenation unit 23. Stream 11 preferably comprises C3-C4 alkanes and low amounts of hydrogen and methane. The top stream 9 from said FCC unit 4 can be combined with stream 18 of reaction products coming from the steam cracking unit 1 and sent to the separation section 2.

The first bottom stream 26 can be divided in a stream 22 and a stream 27, wherein stream 27 is combined with bottom stream 16 of the FCC unit 4. Stream 16 can be further combined with stream 24 of gasoline hydrocracker (GHC) unit 5. In another embodiment (not shown) stream 16 can be recycled to FCC unit 4, in combination with a purge.

The Example disclosed herein makes a distinction between several cases. The experimental data as provided herein were obtained by flowsheet modelling in Aspen Plus. The steam cracking kinetics were taken into account rigorously (software for steam cracker product slate calculations).

Applied steam cracker furnace conditions:
ethane and propane furnaces: COT (Coil Outlet temperature) =845° C. and steam-to-oil-ratio=0.37, C4-furnaces and liquid furnaces: Coil Outlet temperature=820° C. and Steam-to-oil-ratio=0.37. For the gasoline hydrocracking unit, a reaction scheme has been used that is based on experimental data. A fluid catalytic cracking unit was modeled based on data from literature.

According to case 1 naphtha is only processed through a steam cracker unit.

According to case 2 naphtha is sent to a cascade of a FCC unit and a gasoline hydrocracker (GHC) unit, wherein the gaseous stream formed in the GHC unit is sent to a steam cracker unit and the reaction products from the steam cracker unit are separated. The top stream from the FCC unit is sent to the separation section of the steam cracker unit, and the middle stream of the FCC unit is sent to the GHC unit. the C2-C4 paraffins is separated and fed to the furnace section of a steam cracker unit.

The process flow scheme in case 3 is similar to case 2 but the feedstock in this case is hydrotreated VGO.

The process flow scheme in case 4 is similar to case 2 but the feedstock is sent to a splitter, i.e. a distillation tower, and its bottom stream is used as a feedstock for the FCC unit and its top stream is sent to the steam cracker unit.

Case 1 is a comparative example and case 2, case 3 and case 4 are examples according to the present invention.

Table 1 shows the feedstock for case 1, case 2 and case 4, respectively.

TABLE 1

| Feedstock | | Cases 1 & 2 Naphtha | Case 4 Splitter Feed |
|---|---|---|---|
| n-Paraffins | wt-% | 36.3 | 19.3 |
| i-Paraffins | wt-% | 27.4 | 14.6 |
| Naphthenes | wt-% | 24.1 | 37.6 |
| Aromatics | wt-% | 12.3 | 28.5 |
| Density 60 F. | kg/L | 0.728 | 0.867 |
| IBP | ° C. | 7.9 | 228.5 |
| BP10 | ° C. | | 274.1 |
| BP30 | ° C. | | 294.9 |
| BP50 | ° C. | 120.4 | 315.3 |
| BP70 | ° C. | | 352.1 |
| BP90 | ° C. | | 411.2 |
| FBP | ° C. | 178.3 | 472.8 |

Table 2 shows the feedstock for case 3.

TABLE 2

| Feedstock | | |
|---|---|---|
| SARA Analysis | | Case 3 VGO |
| Saturates | wt-% | 55.5 |
| Aromatics | wt-% | 28 |
| Resins | wt-% | 15.7 |
| Asphaltenes | wt-% | 0.8 |
| Density 60 F. | kg/L | 0.9012 |
| CCR | wt-% | 4.7 |
| Hydrogen | wt-% | 12.84 |
| Sulfur | wt-% | 0.16 |
| Nitrogen | wt-% | 0.25 |
| Nickel | ppm | 6.3 |

Table 3 shows the characteristics of the top steam and bottom stream resulting from fractionating the feedstock sent to the splitter.

TABLE 3

| characteristics of top stream and bottom stream from splitter | | | |
|---|---|---|---|
| | | Top stream from splitter Steam Cracker feed | Bottom stream from splitter FCC Feed |
| Split factor | wt-% | 65.2 | 34.8 |
| n-Paraffins | wt-% | 19.9 | 18.3 |
| i-Paraffins | wt-% | 15.0 | 13.8 |
| Naphthenes | wt-% | 39.2 | 34.8 |
| Aromatics | wt-% | 26.0 | 33.1 |
| Density 60 F. | kg/L | 0.857 | 0.92 |
| IBP | ° C. | 217.6 | 339.3 |
| BP10 | ° C. | 263 | 366.3 |
| BP30 | ° C. | 279.1 | 379.1 |
| BP50 | ° C. | 291.6 | 393 |
| BP70 | ° C. | 305.5 | 410.6 |
| BP90 | ° C. | 325.3 | 445.6 |
| FBP | ° C. | 350.2 | 495.6 |

The battery limit product slate (wt. % of feed) for each of the cases 1, 2, 3, and 4 can be found in Table 4.

TABLE 4 battery limit product slate (wt. % of feed)

| BATTERY LIMIT PRODUCT SLATE | Feed: naphtha | | Feed: HT-VGO | Diesel + |
|---|---|---|---|---|
| | CASE 1 SC | CASE 2 HS-FCC + GHC + SC | CASE 3 HS-FCC + GHC + SC | LVGO2 CASE 4 Splitter |
| H2 | 1% | 1% | 1% | 1% |
| CO/CO2 | 1% | 1% | 0% | 0% |
| COKE | 0% | 3% | 8% | 3% |
| CH4 | 16% | 16% | 9% | 12% |
| ETHYLENE | 33% | 27% | 22% | 27% |
| PROPYLENE | 18% | 35% | 29% | 20% |
| BUTADIENE | 6% | 0% | 1% | 4% |
| ISO-BUTENE | 3% | 0% | 4% | 3% |
| BENZENE | 8% | 2% | 4% | 6% |
| TX CUT | 6% | 14% | 9% | 6% |
| STYRENE | 1% | 0% | 0% | 1% |
| OTHER C7-C8 | 1% | 0% | 0% | 0% |
| C9 RESIN FEED | 1% | 0% | 0% | 2% |
| CD | 2% | 0% | 0% | 2% |
| CBO | 3% | 0% | 0% | 9% |
| LCO | 0% | 0% | 12% | 4% |
| % HIGH VALUE CHEMICALS | 76% | 79% | 69% | 67% |

From the modeling results one can see that for cases 2, 3 and 4 long normal and iso-paraffins are cracked into LPG. The present inventors further found that C7 naphthenes, C8 naphthenes and C9 naphthenes are upgraded by the gasoline hydrocracker (GHC) unit to toluene and xylenes.

In addition, the present inventors found real benefits when processing naphtha through a cascade of an FCC unit followed by a gasoline hydrocracker (GHC) unit. The present inventors assume that, because of the dehydrogenation of naphthenes into aromatics (toluene and xylene), the BTX amount can be increased to 65% with respect to the BTX already present in FCC naphtha, which could be recovered by a pygas treatment unit. An additional potential advantage of the present method is that top stream 19 from distillation tower 3 does not need to be full condensed, if not required for reflux, therefore resulting in potential energy benefits.

The invention claimed is:

1. A process for the production of light olefins and aromatics from a hydrocarbon feedstock, the process consisting of
    (a) feeding a hydrocarbon feedstock into a fluid catalytic cracker (FCC) unit
    (b) separating reaction products, which are generated from the FCC reaction, into a bottom stream, and middle stream and a top stream;
    (c) feeding the middle stream from (b) to a gasoline hydrocracker (GHC) unit,
    (d) separating reaction products of said GHC of step (c) into an overhead gas stream comprising hydrogen, methane and C2-C4 paraffins, a stream rich in BTX and a heavy cycle oil stream,
    (e) separating C2-C4 paraffins from said overhead gas stream coming from the gasoline hydrocracker (GHC) unit, and feeding only said C2-C4 paraffins from said overhead gas stream from the gasoline hydrocracker (GHC) unit directly to the furnace section of a steam cracker unit;
    (f) combining the heavy cycle oil stream from (d) and the bottom stream from (b);
    (g) separating reaction products of said steam cracking unit in a separation section into an overhead stream, which contains C2-C6 alkanes, a middle stream, which contains C2-olefins, C3-olefins and C4-olefins, a first bottom stream comprising C9+ hydrocarbons, and a second bottom stream comprising aromatic hydrocarbon compounds and non-aromatic hydrocarbon compounds; and
    (h) sending the top stream from (b) to the separation section from (g), wherein the temperature in the FCC is 700° C.

* * * * *